(No Model.)

G. S. ROMINGER.
DRILL CHUCK.

No. 265,151. Patented Sept. 26, 1882.

Witnesses
Harry Drury
James T. Tobin

Inventor
G. S. Rominger
by his Attorneys.
Howson and Sons

UNITED STATES PATENT OFFICE.

GEORGE S. ROMINGER, OF PHILADELPHIA, PENNSYLVANIA.

DRILL-CHUCK.

SPECIFICATION forming part of Letters Patent No. 265,151, dated September 26, 1882.

Application filed April 24, 1882. (No model.)

*To all whom it may concern:*

Be it known that I, GEORGE S. ROMINGER, a citizen of the United States, and a resident of Philadelphia, Pennsylvania, have invented certain Improvements in Tool-Holding Chucks, of which the following is a specification.

My invention relates to an improvement in the chuck for which Letters Patent No. 243,978 were granted to me July 5, 1881, the object of my improvement being to simplify the invention described in the said patent.

Figure 1:
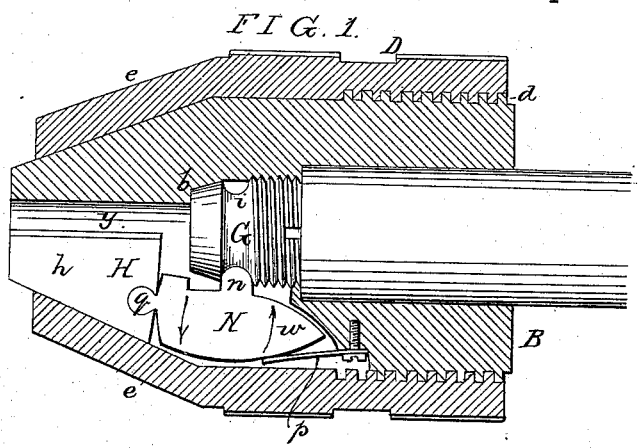
Figure 2:
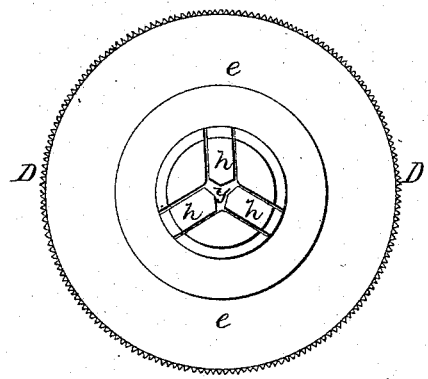
Figure 3:
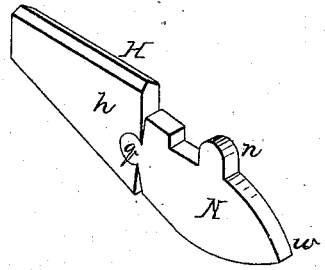

In the accompanying drawings, Figure 1 is a view, partly in section, of my improved chuck; Fig. 2, an end view of the same, and Fig. 3 a perspective view of one of the jaws and the lever connected therewith.

Into the body B of the chuck, which is adapted to a mandrel or lathe-spindle, is screwed a stud, G, the extreme end of which bears against a shoulder, $b$, formed within the said body, on the exterior of which body is formed a screw-thread, $d$, adapted to the internal thread of the sleeve D. A portion, $e$, of this sleeve is made cone-shaped or tapering, and a portion of the body is made on a corresponding taper. The threaded stud G may, if desired, form a part of the mandrel. Radial slots, preferably three in number, are made in the body of the chuck for receiving as many jaws, H, each jaw having its inner edge parallel with the axis of the chuck and its outer edge inclined to correspond with and fit snugly against the interior of the tapering portion of the sleeve.

The central stud, G, has a concave annular groove, $i$, for receiving the projecting pivots $n$ of as many levers N as there are jaws H, each lever being loosely connected to one of the jaws by a rounded projection, $q$, on the lever, adapted to a corresponding recess in the jaw.

Each radial slot in the body of the chuck contains a spring, $p$, which is secured to the said body, the tendency of this spring being to force the arm $w$ of the lever inward and the other arm outward in the direction of the arrows, and consequently to maintain the outer edge of the jaw to which the lever is connected against the tapering interior of the sleeve.

As shown in Figs. 1 and 2, the jaws are closed nearly to their utmost limit; but on screwing the sleeve outward from the body of the chuck the jaws will be opened, owing to the influence of the springs on the levers N, the springs, through the medium of the levers, continuing to maintain the outer edges of the jaws in contact with the interior of the tapering portion of the sleeve.

On introducing the stem of a tool into the central opening, $y$, of the chuck between the jaws and screwing the sleeve inward the jaws will be moved radially toward the center of the chuck and will grip the stem, the inner edges of the jaws taking effect on the same throughout their entire length, for these edges are parallel with each other and with the axis of the chuck under all circumstances.

One of the advantages of my invention is the facility with which the jaws and levers can be introduced to their places. Thus a lever and a jaw connected thereto can be passed into one of the radial slots, and the lower pointed arm of the lever will take its place against the inner side of the spring, and the latter will yield as the projecting pivot slides against the beveled end $t$ of the stud G, and when the projection is opposite the groove $i$ the spring, acting on the outer edge of the lever, will cause the projection to enter the groove.

It will be seen that there are in my present invention features seen in my patent of July 5, 1881—namely, the jaws loosely connected to pivoted levers; but in that patent the levers were acted on by the sleeve, the jaws hanging loosely to the levers, while the sleeve in my present invention acts on the jaws, which are consequently steadier than those in the patented chuck.

I claim as my invention—

1. The combination, as described, of the slotted body B and its tapered sleeve D with the pivoted levers N and the jaws H, connected to the ends of the levers, and having outer inclined edges adapted to the interior of the tapering portion of the said sleeve.

2. The combination, as described, of the slotted body B and sleeve D of the chuck, with the pivoted levers N, jaws H, and springs $p$, one spring in each radial slot.

In testimony whereof I have signed my name to this specification in the presence of two subscribing witnesses.

GEO. S. ROMINGER.

Witnesses:
HARRY DRURY,
HARRY SMITH.